March 18, 1941.　　　　　P. H. DIEHL　　　　　2,234,966
FUEL CONTROLLING DEVICE FOR INTERNAL COMBUSTION ENGINES
Filed March 9, 1936　　　5 Sheets-Sheet 1
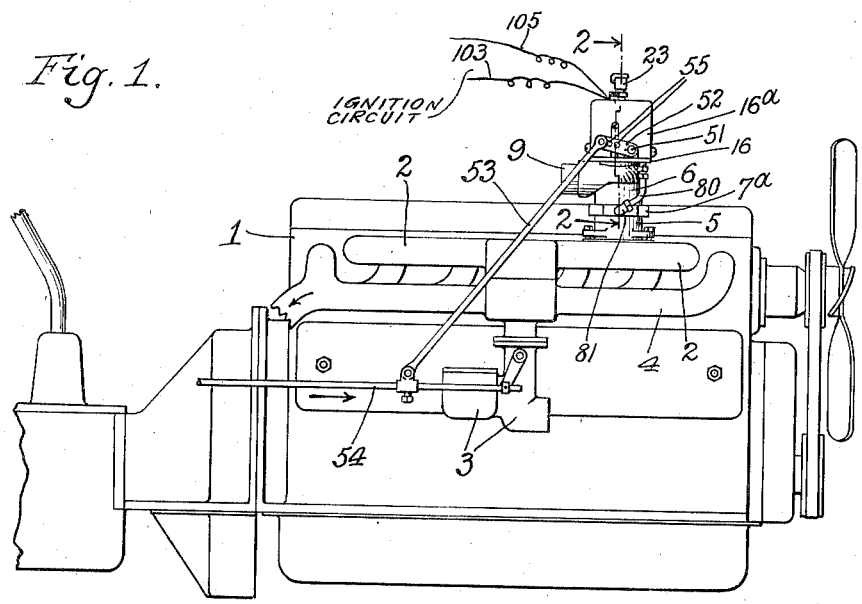
Fig. 1.
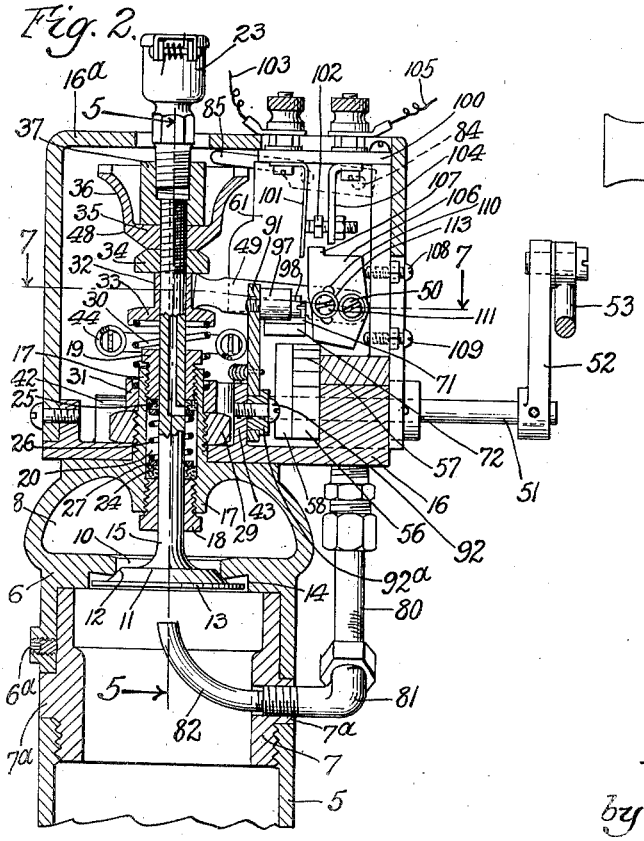
Fig. 2.
Fig. 3.
Inventor
Paul H. Diehl
by Parker & Carter
Attorneys.

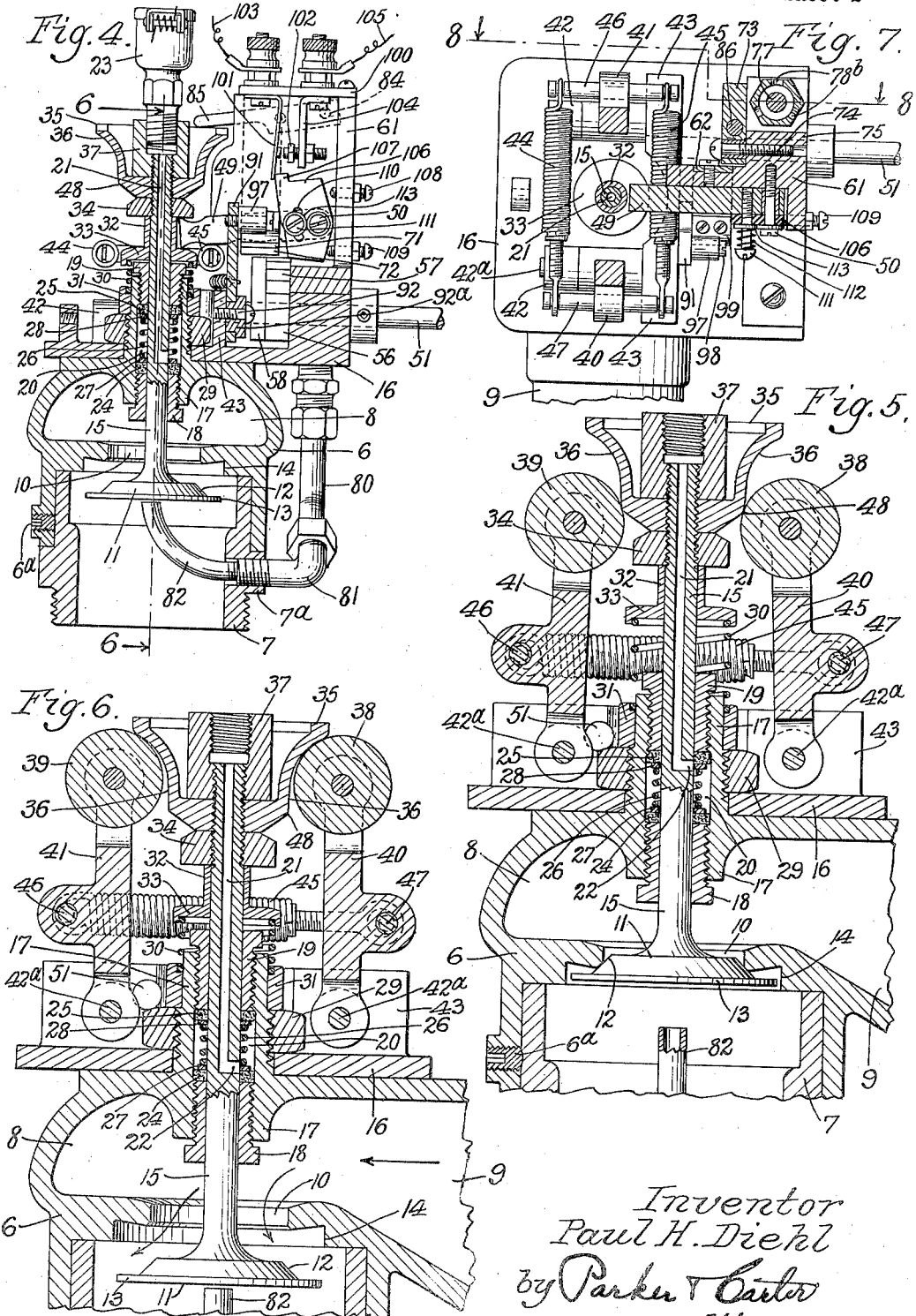

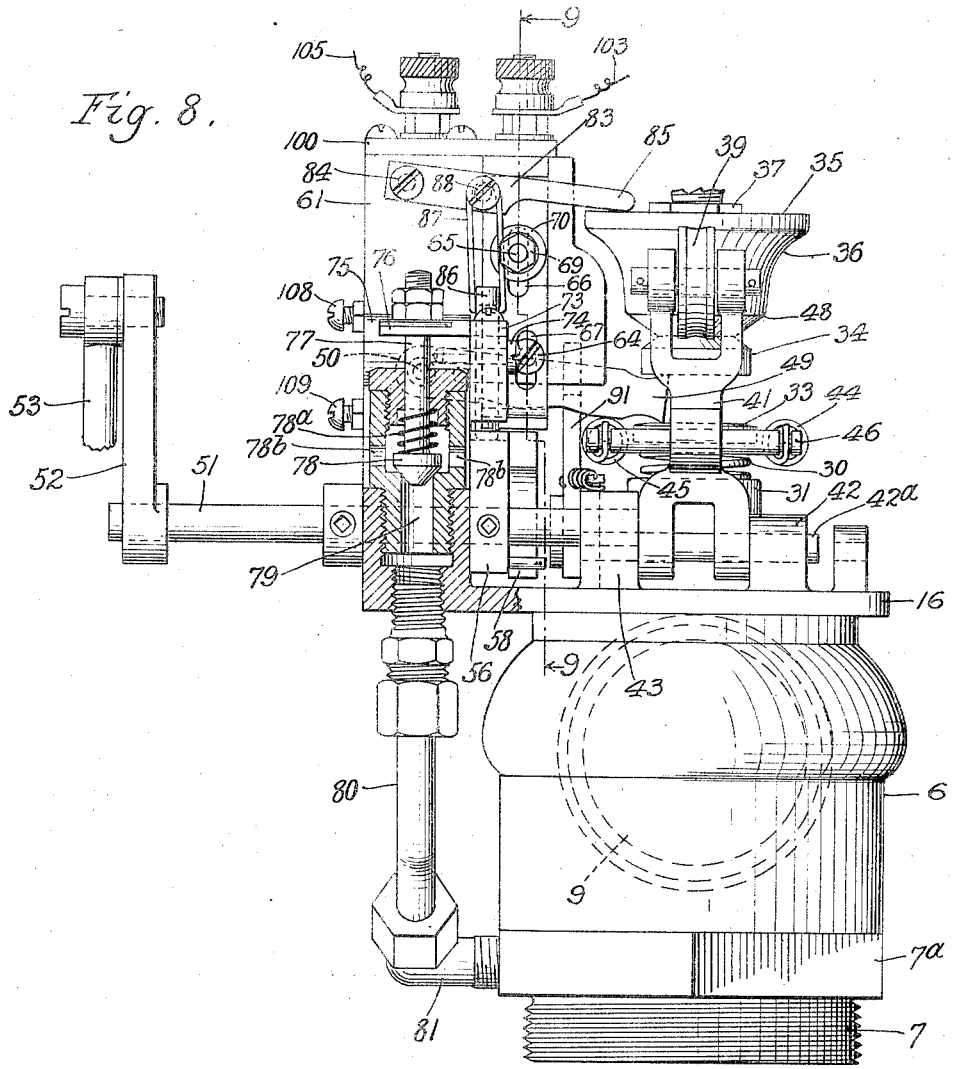

March 18, 1941.    P. H. DIEHL    2,234,966
FUEL CONTROLLING DEVICE FOR INTERNAL COMBUSTION ENGINES
Filed March 9, 1936    5 Sheets-Sheet 4
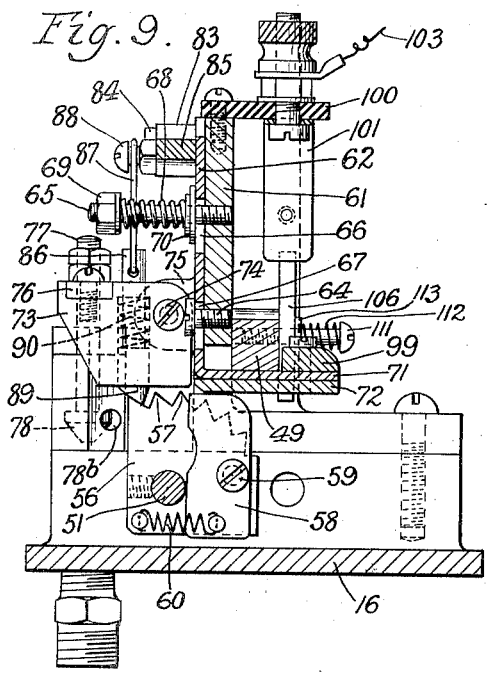
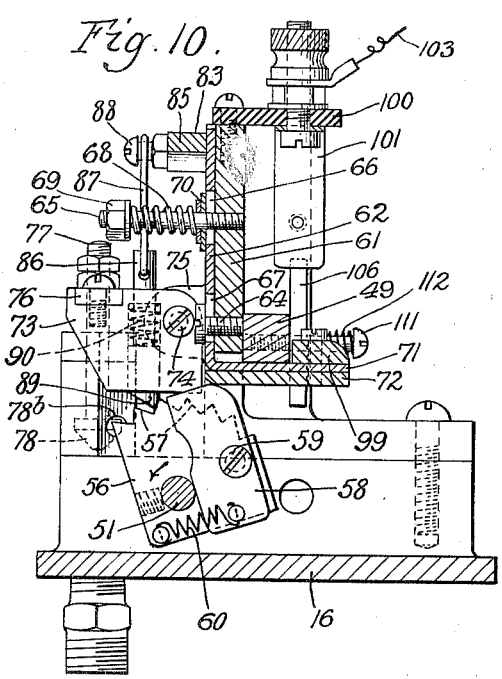
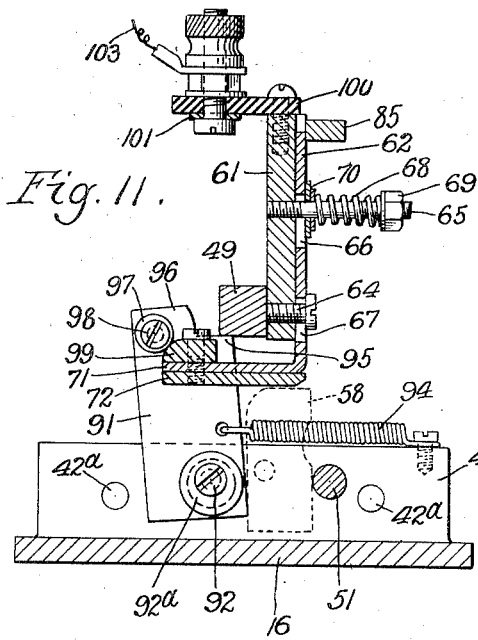
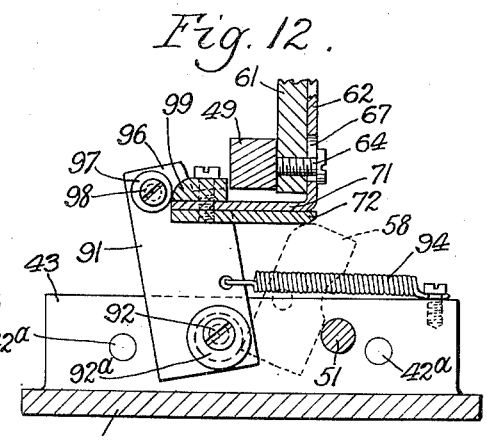
Inventor
Paul H. Diehl
by Parker & Carter
Attorneys

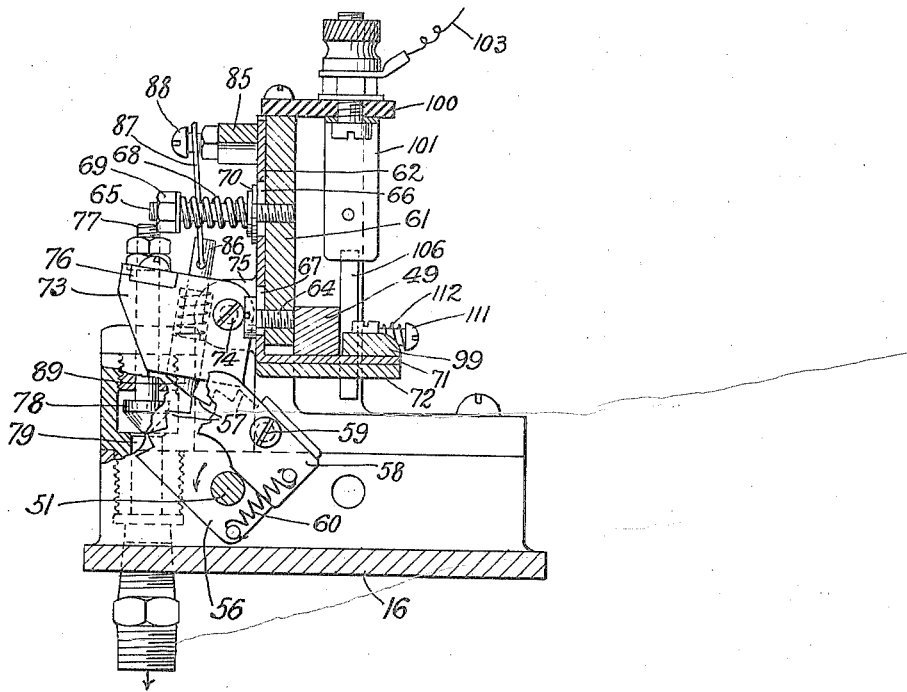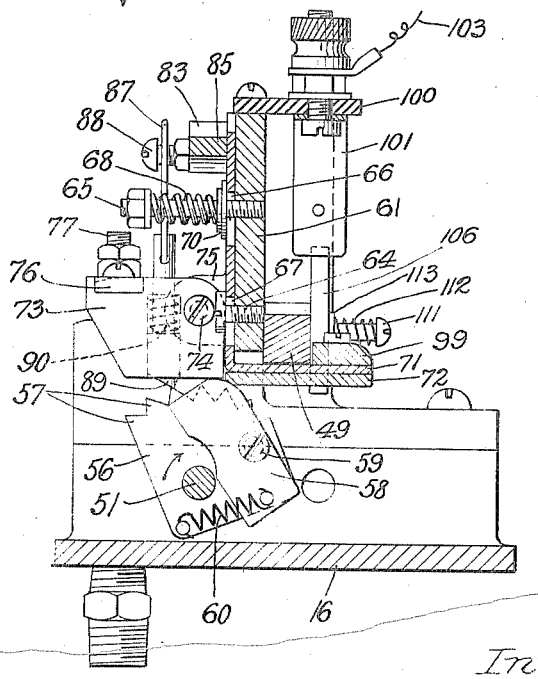

Patented Mar. 18, 1941

2,234,966

UNITED STATES PATENT OFFICE 2,234,966

FUEL CONTROLLING DEVICE FOR INTERNAL COMBUSTION ENGINES

Paul H. Diehl, Chicago, Ill., assignor of one-half to Donald M. Carter, Chicago, Ill.

Application March 9, 1936, Serial No. 67,812

12 Claims. (Cl. 123—97)

This invention relates to fuel controlling devices for internal combustion engines and has for its object to provide a new and improved device of this description.

The invention has as a further object to provide a fuel controlling device for the engine which eliminates "gassing." The invention has as a further object to provide a fuel controlling device of this description with a valve for automatically establishing communication between the intake manifold and the outside atmosphere when the supply of fuel to the motor is diminished or completely cut off, with means for preventing "fluttering" of the valve. The invention has as a further object to provide a device of the kind described with means for locking under certain conditions the valve which establishes communication between the intake manifold and the atmosphere.

The invention has as a further object to provide simple and effective means for lubricating the valve stem. The invention has as a further object to provide means for closing the valve by means of which communication is established between the intake manifold and the outside atmosphere, during partial deceleration, as when going down hill or on a long grade. The invention has as a further object to provide a device of the kind described wherein the valve which establishes communication between the cylinders and the atmosphere is controlled separate from and in addition to vacuum control of the engine on which it is installed.

The invention has other objects which are more particularly pointed out in the accompanying description.

Referring now to the drawings, wherein I have illustrated one form of device embodying the invention, Fig. 1 is a view of a typical internal combustion engine provided with one form of device embodying the invention.

Fig. 2 is an enlarged sectional view taken on line 2—2 of Fig. 1, with the main valve closed;

Fig. 3 is an enlarged view of that portion of the locking device which engages the valve stem;

Fig. 4 is a sectional view similar to Fig. 2, with the main valve open and a portion of the cover removed;

Fig. 5 is an enlarged sectional view taken on line 5—5 of Fig. 2;

Fig. 6 is an enlarged sectional view taken on line 6—6 of Fig. 4;

Fig. 7 is a sectional view taken on line 7—7 of Fig. 2, with parts omitted;

Fig. 8 is an enlarged sectional view taken on line 8—8 of Fig. 7;

Fig. 9 is a sectional view taken on line 9—9 of Fig. 8, showing the main valve open;

Fig. 10 is a view similar to Fig. 9 showing the accelerator partly depressed so as to partially close the main valve;

Fig. 11 is a sectional view taken on line 9—9 of Fig. 8 and looking in the opposite direction of Fig. 9, showing the valve operating lever in its locked position;

Fig. 12 is a view similar to Fig. 11 with parts omitted, showing the lever in its unlocked position;

Fig. 13 is a view similar to Fig. 10 showing the accelerating action under partial deceleration;

Fig. 14 is a view similar to Fig. 9, showing the valve fully open and the accelerator in the act of being released.

Like numerals refer to like parts throughout the several figures.

In the drawings I have illustrated a particular construction embodying the invention for the purpose of making the invention clear, but it is of course evident various other constructions incorporating the invention may be utilized. In the drawings I have illustrated a typical form of internal combustion engine 1, having the usual or any desired number of cylinders in which the explosive mixture is used, there being an intake manifold 2 into which the explosive mixture from the carburetor 3 passes, such mixture passing from the intake manifold to the cylinders. There is an exhaust manifold 4 through which exhaust gases pass. The present device is connected with the intake manifold. It may of course be arranged in any desired position, providing this arrangement permits atmospheric air to be injected in a controlled manner into the cylinders of the engine. In the particular construction shown there is an inlet pipe section or member 5 connected with the intake manifold 2. A housing 6 is connected with the member 5 in any desired manner, as by means of the connecting member 7. The connecting member 7 is screw-threaded to one of the parts and preferably has an annulus or shoulder 7a against which the parts abut and is attached to the other part by a set screw 6a. The housing 6 is provided with a chamber 8 which connects with the air inlet 9, see Fig. 1. This air inlet may connect directly with the atmosphere or it may be connected to the exterior of the exhaust manifold so that the air entering through it may be heated. The housing 6 is provided with a port 10 which is controlled by a valve 11. This port when the valve is open, establishes communication between the intake manifold and the outside atmosphere under certain predetermined conditions when the supply of fuel to the motor is diminished or completely cut off. When the engine is in operation and the supply of fuel mixture decreased or shut off, there is a partial vacuum beneath the valve 11 and the pressure of the outside atmosphere forces it open. The valve 11 is preferably provided with a seating portion 12 which seats on the edge of the port 10 and there is preferably provided a peripheral annulus 13 which projects beyond the seating portion and in fairly close proximity to the wall 14 opposite the valve. This restricts the air as it rushes in when the valve is first opened and causes it to have comparatively high velocity, which tends to assist in opening the valve after the initial opening movement and because of the greater area and pressure surface, holds the valve open.

The valve 11 is provided with a valve stem 15 which passes up through an opening in the housing 6 and up through a casing 16 having a removable portion 16a. The housing 6 at the point where the valve stem 15 extends through it, is provided with a hub portion 17, either integral therewith or separate therefrom, which has a passageway through it larger in diameter than the valve stem 15. At the upper and lower ends of the hub portion 17 are the hollow screw-threaded plugs 18 and 19 through which the valve stem 15 passes, the structure forming a guide for the valve stem. Intermediate the plugs 18 and 19 is an oil chamber 20 into which oil is received in any suitable manner, as for example by means of a passageway 21 in the valve stem 15, which has an opening 22 communicating with the oil chamber 20 and which receives its oil from a grease cup 23 connected with the upper end of the valve stem. Within the oil chamber 20 are the non-metallic packing members 24 and 25 which are held in their packing position by the spring 26 which preferably engages metal washers 27 and 28 contacting with the packing members. This arrangement provides an efficient oiling means for the valve stem so as to prevent the valve stem from sticking.

The casing 16 is held in proper relation to the housing 6 by means of a nut 29 which engages threads on the exterior of the hub portion and which when tightened press the bottom of the casing 16 against the housing 6.

Some means is provided for preventing the valve 11 from opening due to the partial vacuum below the valve during the normal operation of the engine. For this purpose there is provided a spring 30 which engages a stop 31 at one end and a member 32 at the other end connected with the valve stem, the spring thus tending to hold the valve closed. The member 32 has an annulus 33 against which the spring presses and is held against upward movement by a nut 34 threaded on to the valve stem so as to be adjustable. Located above this nut and also threaded on the valve stem is a flaring head 35 preferably provided with a flaring curved outer wall 36. This head is preferably hollow and there is a hollow nut 37 on the interior thereof, which is threaded to the valve stem 15 and with which the grease cup 23 is connected. Associated with the flaring head 35 are the engaging members 38 and 39, preferably rollers, see Figs. 5 and 6. These engaging members are mounted upon the pivoted arms 40 and 41, which are pivoted to some fixed part of the device. As herein shown, the casing 16 is provided with lugs 42 and 43 with which these levers are pivotally connected, see Figs. 6, 7 and 8. Pins 42a pass through these lugs and through the levers. The levers are preferably bifurcate at each end, the engaging members 38 and 39 being inserted between the upper bifurcated ends.

Some means is provided for elastically forcing the levers toward each other so as to force the engaging members 38 and 39 into contact with the head 35. As herein shown this is accomplished by means of springs 44 and 45 which are connected to pins 46 and 47 attached to the levers 40 and 41, see Figs. 7 and 8.

The head 35 is provided at its lower portion with the shoulder 48 which is engaged by the members 38 and 39 when the valve 11 is closed and this shoulder tends to retard the initial movement of the valve and make it more difficult to start the opening movement thereof. The members 38 and 39 and the springs 44 and 45 assist the spring 30 in holding the valve 11 closed until the pressure beneath the valve is reduced a sufficient amount to make it desirable to open the valve.

With the parts thus far described, when the supply of fuel to the motor is completely cut off or diminished a sufficient amount thereby increasing the vacuum, the pressure of the outside atmosphere on top of the valve overcomes the resistance of the springs and the shoulder 48 and the valve is opened to let air into the intake of the engine.

The device as described up to this point has certain defects which I have remedied by certain features which will now be described. As heretofore described, for example, one of the defects is that the valve 11 is at all times under the control of the vacuum in the engine. It is desirable to have this valve 11 so that it can be controlled independent of the engine and by the driver. I have, for example, provided means by which the main valve 11 can be closed independent of the vacuum by breaking the vacuum or by positively forcing the valve closed, and I have also provided means for preventing fluttering and for locking the valve closed and still permit acceleration and deceleration, so as to give the driver complete control of the engine and I have also provided an adjustment feature timing the ignition, so as to make it operative at any fractional time of closing the valve. For certain of these purposes I provide valve opening and valve locking mechanism. As a part of this mechanism there is provided a valve operating lever 49, see Figs. 2, 3, 4 and 9 to 12, which lever has its ends received between the parts 33 and 34 on the valve stem 15 of the valve 11. The other end of this lever is pivoted at 50 to some fixed part, such as the fixed support 61 or some part associated therewith. This lever is provided with means under certain conditions for actuating it and for locking it against actuation, so that the valve will be locked closed. I provide certain means for this purpose which is preferably connected with the accelerator of the engine.

In the particular construction shown, I provide a shaft 51, which is mounted on the device in a suitable bearing or bearings and which is provided with a crank 52, said crank being connected by a link 53, see Fig. 1, with the accelerator member 54 of the engine. Crank 52 has a plurality of holes 55 for connecting the link 53 with it. These holes adapt the device for different engines, depending upon where the device is anchored to the engine and to compensate for differences in travel of the acceleration members. Connected with the shaft 51 is an auxiliary valve control cam 56 which is provided with a series of teeth 57 similar to ratchet teeth. At the side of this control cam 56 there is provided an escapement lever 58. This lever is preferably pivoted to the control cam by the pivot 59 and is held in position by some elastic means, such as the spring 60, see Figs. 9 and 10.

Connected with a fixed part 61 associated with the casing is a slide member 62, which is held in position and guided by the holding devices 64, 56, which is provided with slots 66 and 67 through which the holding devices pass. Some means is provided for frictionally pressing the slide into contact with the fixed part so that it will be held in any position into which it is moved. As herein shown, this is accomplished by means of a spring 68 on the member 65, one end of which engages the nut 69 and the other end of which engages a member or members 70 which surrounds the member 65 and engages the sliding member 62. By means of the nut 69 the pressure may be adjusted to secure the desired effect. The sliding member 62 has a laterally projecting portion 71 which is engaged by the lever 49 when the valve stem is depressed and which moves the sliding member downwardly, see Fig. 10. The part 71 is provided at its bottom with a wearing plate 72.

In Fig. 9 valve 11 is open and the slide 62 down. The accelerator has been released, bringing the escapement lever 58 back to position under the slide, ready to raise the slide when the accelerator is depressed. Fig. 10 is a view similar to Fig. 9, showing the accelerator partly depressed, the cam 56 and escapement lever 58 rotated to the left, raising the slide 62, which raises lever 49 and closes the valve 11. A further movement down and up of the accelerator will rock cam 56 and lever 58 back and forth, causing teeth 57 on cam 56 to contact pin 86 and rock the trip lever 73 to admit air under the valve 11 and overcome the vacuum, closing valve 11 completely. This action is shown in Fig. 13.

Fig. 11 is a view looking in the opposite direction of Fig. 9, showing the valve operating lever in its locked position, while Fig. 12 is a view similar to Fig. 11 with parts omitted, showing the lever in its unlocked position. Fig. 13 is a view similar to Fig. 10, wherein the parts are shown in the position they occupy under partial deceleration. Fig. 14 is a view similar to Fig. 9 with the valve fully open and with the accelerator in the act of being released, which causes the control cam and escapement lever to be moved to the right, which will bring the escapement lever back under the slide 62 by bringing it under the parts 71 and 72, so as to bring the parts in the position shown in Fig. 9.

Substantially at right angles to the sliding plate 62 I provide a trip lever 73 which is pivoted at 74 to a lug 75 on a stationary part 61 of the device. Connected with this trip lever and laterally projecting therefrom is a valve controlling part 76. Connected with the valve controlling part 76 is the valve stem 77 of an auxiliary air valve 78, which controls the passageway 79 communicating with a pipe 80 which leads to a point below the valve 11, see Figs. 2 and 8. The pipe 80 has an elbow member 81 which is screwthreaded into the member 7 and which has an upwardly extending end 82 in proximity to the valve 11 but at a sufficient distance below the said valve so as not to interfere with its proper opening. A spring 78a normally tends to hold the auxiliary valve 78 closed. When the valve 78 is open, air passes through the ports 78b below the valve in the passageway 79.

I provide means for operating this auxiliary air valve 78 under certain conditions, such as during partial deceleration. The auxiliary valve 78 is operated by the following means. Above the valve controlling part 76 is a lever 83 pivoted at 84 to a fixed part 61 and having an end 85 which engages the head 35 on the valve stem 15. A pin 86 in connection with the lever 83 by the connecting member 87, which is arranged to permit movement of the pin with relation to said lever. As herein shown, the connecting member 87 is in the form of a loop passing over a screw or pin 88 attached to the lever 83. This pin 86 passes through an opening in the trip lever 73. The lower end of this pin is beveled so as to provide a tooth-shaped end 89 which cooperates with the teeth 57 on the control cam 56, see Fig. 9. A spring 90 normally tends to press the pin toward the cam. When the valve 11 is closed the lever 83 holds the pin 86 out of contact with the teeth 57 of the control cam 56. When the valve 11 opens, both the valve operating lever 49 and the lever 83 are automatically lowered and the lever 83 lowers the pin 86 into the trip lever 73 and permits the lowered part of the pin to engage in one of the teeth of the valve control cam 56. If now the driver should decelerate, the pin being tapered and with the spring tension upon it, will simply slide over the teeth similar to a ratchet. In the event, however, acceleration takes place, the control cam is moved forward and in an upward position and a tooth thereon engages the pin 86 and through the pin lifts the trip lever 73, so as to lift and open the auxiliary valve 78, so as to permit air to flow through the side port holes and beneath the valve and through pipe 80 and into the space beneath the valve 11 so as to increase the pressure underneath the valve and cause the valve to automatically close.

As a safety measure under certain conditions, as in descending a steep hill, if the driver should find that the valve 11 will not close by means of the admission of air through the auxiliary valve 78, he can by a complete deceleration, as by quickly lifting his foot from the accelerator, and then immediately accelerating, mechanically or positively close the valve 11. This is accomplished by the following means. When the valve 11 is open, the lever 49 is moved down and moves the slide member 62 down to the position shown, for example, in Fig. 9. When the parts are in their accelerating position and are moved to their fully decelerating position, the escapement lever 58 during the backward movement has its top engaged by the wearing plate 72 of the slide member 62, see Fig. 12, so that it will be moved to an inclined position, thereby energizing the spring 60, as shown for example in full lines in Fig. 13, so as to pass under the bent end of the slide member 62. This slide member is now in its down position, the main valve being closed. If now the parts are moved to their accelerating position, the escapement lever 58 engaging wearing plate 72 on the bottom of the slide member 62 straightens up and lifts the slide member 62 to the position shown in Fig. 10, and since the main valve lever 49 is engaged by the bent end of the slide member 62, as shown for example in Fig. 9, it will be lifted with the slide member so as to lift and close the main valve 11. The accelerator may then be moved back and forth to accelerate or decelerate and the main valve 11 is then free to again open. Means is provided for automatically locking the main valve closed and also for maintaining it locked in a closed position while the accelerator is moved back and forth to accelerate or decelerate as long as the parts are not moved to the complete decelerating position. The unlocking of the main valve 11 is brought about by bringing the parts to the full decelerating position. This construction prevents fluttering of the main valve and plays a very important part in the operation of the device under partial deceleration and also makes it unnecessary to have restricting rings or devices associated with the valve 11. This locking device consists of a locking lever 91 pivoted at 92 to a fixed member 43, see Figs. 2, 4, 7, 11 and 12. Means is provided for adjusting the locking lever so as to raise or lower it or move it laterally to initially maintain it in the proper position. This is secured by placing the pivot 92 in an eccentric 92a, which can be rotated to adjust the lever to its proper position. The locking lever 91 is provided with a retracting spring 94. This lever has a shoulder 95 and projecting above this shoulder is the upper end portion 96. Connected with the upper part 96 is a stop device 97 which is preferably adjustable by having it mounted eccentrically on the set screw 98 on which it can be rotated to move the stop 97 laterally. This stop 97 engages the end 71 of the slide member 62 when the slide member is in its up position, so as to be held in its unlocking position. Associated with the end 71 of the slide member 62 is a cam piece 99 which as herein shown is a piece with a curved face opposed to the stop 97. When the valve 11 is open the lever 49 is moved down to the position shown in Fig. 12 and the locking lever is maintained in its unlocking position as long as the parts are in this position, and the accelerator may then be moved back and forth to accelerate or decelerate as long as it is not moved to its full decelerating position, without interfering with the valve 11. If now the valve 11 is closed for any reason, the lever 49 moves up and the spring 94 moves the locking lever 91 so that the shoulder 95 moves under the locking lever, as shown in Fig. 11, and locks it so as to maintain the valve in its closed position. The accelerator may now be moved back and forth to accelerate or decelerate as long as it is not moved to its full decelerating position, without unlocking the valve 11, said valve remaining locked until the accelerator is moved to its full decelerating position and then started in its accelerating movement. This latter movement causes the escapement lever 58, as hereinbefore described, to engage the wearing plate 72 on the bottom of the slide member 62 and move it upwardly. Cam member 99 thereon then engages the stop 97 on the locking lever 91 and moves the locking lever so that the shoulder 95 is moved out from under the lever 49, as shown in Fig. 12, whereupon the valve 11 is free to open.

As before stated, this is a vital arrangement of the device as it permits the driver to maintain the valve 11 in a closed position, for example, when going down hill and still permits him to accelerate or decelerate, allowing him to use the engine for braking purposes and to slow down to pass other vehicles and then speed up, and it in fact gives him complete control of his engine independent of the vacuum in the cylinders. The device also prevents fluttering of the valve 11.

It is important, particularly on large engines and depending upon the type of manifolding of the engine, that the circuit controlling the spark plugs can be adjusted. On an engine, for example, where there is considerable distance between the carburetor and the end cylinders or combustion chambers, it is particularly required due to the fact that when the main valve 11 opens the gas-air mixture in the manifold between the valve 11 and the end cylinders is forced through to the cylinders by the sudden inrush of air past the valve 11, and consequently with the clutch disengaged, when this gas-air mixture reaches the cylinder and is ignited, it causes a momentary speeding up of the engine, which is not only annoying but which makes it difficult for the driver to immediately engage the gear. This is especially true when shifting gears or double clutching. To prevent this, there is provided an ignition circuit breaker, which as herein shown, consists of an insulating member 100 attached to some fixed part at the upper part of the device. Attached to the insulating member 100 is a spring contact 101, the contact member being connected in the ignition circuit by the conductor 103. Opposed to the contact member 101 is a stationary contact member 102 which may be adjustable in the arm 104 and which is connected in the ignition circuit by the conductor 105. Mounted on the valve operating lever 49 is a control member 106 having an engaging part 107 of insulating material. This part 107 engages the spring contact member when the lever 49 is moved by the opening of the valve 11 and breaks the circuit. The control member 106 is pivoted on the same pivot 50 as the lever 49, but its movement may be limited by the adjustable stops 108, 109, thereby making and breaking the circuit early or late as desired. To allow for the greater movement of the lever 49 I provide a curved slot 110 and an adjustable friction device comprising the screw 111, spring 112 and the washer 113.

The purpose and importance of this construction will be seen from the following. On engines, for example, where there is considerable distance between the carburetor and the end cylinder, when the valve 11 opens, the fuel mixture in the manifold between the valve and the end cylinder is forced through by the sudden inrush of air through the valve 11. If now, the clutch is disengaged when this fuel mixture reaches the combustion chambers of the cylinders and is ignited, there is a momentary speeding up of the engine which is not only annoying but which makes it difficult for the driver to immediately engage the gears when shifting gears or double clutching. By means of this device, I provide means whereby a spark in the combustion chamber is provided as soon as the valve 11 closes or at any point of its closing movement, and thus avoid the conditions above set out. I prefer to so adjust the device that the ignition circuit is closed as soon as the operator starts to accelerate, so as to provide a spark for the first mixture that reaches the engine cylinders after the valve 11 begins to close. The entire mechanism is easily accessible by simply removing the cover.

It will therefore be seen that the ignition system for the fuel in the cylinders is provided with a circuit controlling device which is operated responsive to the movement of the valve 11 and that the device may be so adjusted when installed to break the circuit of the ignition system at any degree of opening of the valve 11 and to close it at any degree of closing of the valve 11, or the circuit controlling device may be rendered inoperative so that it remains closed during all the various movements of the valve 11, as would be required in certain of the engines now in use.

I claim:

1. A fuel controlling device for internal combustion engines comprising an air admitting device for admitting air into the cylinders of the engine, a port therefor, a valve for controlling said port responsive to the suction of the engine when in operation, and holding means for holding said valve from fluttering during partial acceleration and deceleration.

2. A fuel controlling device for internal combustion engines comprising an air admitting device for admitting air into the cylinders of the engine during deceleration of the engine, a port therefor, a valve for controlling said port responsive to the suction of the engine when in operation, and means for locking said valve in a closed position under predetermined conditions, and unlocking mechanism for said valve under the control of the operator.

3. A fuel controlling device for internal combustion engines comprising an air admitting device for admitting air into the cylinders of the engine during deceleration of the engine, a port therefor, a valve for controlling said port responsive to the suction of the engine when in operation, and means for locking said valve in a closed position under predetermined conditions, and unlocking mechanism for said valve controlled by the accelerator of the engine.

4. A fuel controlling device for internal combustion engines comprising an air admitting device for admitting air into the cylinders of the engine, a port therefor, a valve for controlling said port responsive to the suction of the engine when in operation, means for admitting air on the suction side of said valve under predetermined conditions, tending to move it to its closed condition.

5. A fuel controlling device for internal combustion engines comprising an air admitting device for admitting air into the cylinders of the engine, a port therefor, a valve for controlling said port responsive to the suction of the engine when in operation, means for admitting air to the suction side of said valve, an auxiliary valve controlling said means, said auxiliary valve adapted to be controlled by the operator.

6. A fuel controlling device for internal combustion engines comprising an air admitting device for admitting air into the cylinders of the engine, a port therefor, a valve for controlling said port responsive to the suction of the engine when in operation, means under the control of the operator for closing said valve, and means for locking said valve closed while the throttle of the engine is in position to partially accelerate and decelerate.

7. A fuel controlling device for internal combustion engines comprising an air admitting device for admitting air into the cylinders of the engine, a port therefor, a valve for controlling said port responsive to the suction of the engine when in operation, means under the control of the operator for closing said valve, means for locking said valve closed while the throttle of the engine is in position to partially accelerate and decelerate, and an unlocking device for unlocking said valve when the parts are moved to their fully decelerating position and started on their accelerating movement.

8. A fuel controlling device for internal combustion engines comprising an air admitting device for admitting air into the cylinders of the engine during deceleration of the engine, having a port connected with the outside air, a valve for controlling said port responsive to the suction of the engine when in operation, a valve operating lever connected with said valve, actuating mechanism under the control of the operator and adapted to be moved by the operator to move said valve operating lever, to move the valve to its closed position.

9. A fuel controlling device for internal combustion engines comprising an air admitting device for admitting air into the cylinders of the engine, having a port connected with the outside air, a valve for controlling said port responsive to the suction of the engine when in operation, a valve operating lever connected with said valve, actuating mechanism under the control of the operator and adapted to be moved by the operator to move said valve operating lever, to move the valve to its closed position, said actuating mechanism being separate from said lever so that the valve may be moved independently of said actuating mechanism.

10. A fuel controlling device for internal combustion engines comprising an air admitting device for admitting air into the cylinders of the engine, a port therefor communicating with the external air, a valve for opening and closing said port responsive to the suction of the engine when in operation, means when said automatic valve moves to its closed position, for automatically locking it in its closed position, and means for holding said valve in its locked position until complete deceleration occurs.

11. A fuel controlling device for internal combustion engines having an electrical ignition device for the fuel in the cylinders, comprising an air admitting device for admitting air into the cylinders of the engine, a port therefor, a valve for controlling said port, a circuit controlling device associated with said ignition device, and means responsive to the movement of said valve for actuating said circuit controlling device and means for maintaining the circuit controlling device in a closed position, to maintain the ignition device closed during all the various positions of said valve.

12. A fuel controlling device for internal combustion engines having an accelerator, comprising an air admitting device for admitting air into the cylinders of the engine, a port therefor, a main valve for controlling said port responsive to the suction of the engine when in operation, and means for admitting air on the suction side of said main valve, tending to move it to its closed position, said means responsive to the movement of the accelerator of the engine.

PAUL H. DIEHL.